United States Patent [19]

Martinell

[11] Patent Number: 5,362,400
[45] Date of Patent: Nov. 8, 1994

[54] PROCESS FOR THE PURIFICATION OF WATER

[75] Inventor: Hakan R. Martinell, Täby, Sweden
[73] Assignee: Paref AB, Taby, Sweden
[21] Appl. No.: 962,218
[22] PCT Filed: Jun. 26, 1991
[86] PCT No.: PCT/SE91/00464
  § 371 Date: Mar. 3, 1993
  § 102(e) Date: Mar. 3, 1993
[87] PCT Pub. No.: WO92/00918
  PCT Pub. Date: Jan. 23, 1992

[30] Foreign Application Priority Data

Jul. 4, 1990 [SE] Sweden .............. 9002355-7

[51] Int. Cl.⁵ ............................ C02F 1/52
[52] U.S. Cl. .................. 210/717; 166/268;
  210/719; 210/721; 210/722; 210/747; 210/757;
  210/758; 210/170; 210/199; 210/220; 261/93
[58] Field of Search .............. 166/268–270,
  166/306; 210/721, 722, 717, 747, 758, 170,
  195.1, 719, 199, 220, 752, 757, 758; 261/93,
  121.1

[56] References Cited

U.S. PATENT DOCUMENTS

| | | | |
|---|---|---|---|
| 2,622,683 | 12/1952 | Silitch et al. | 210/170 |
| 3,649,533 | 3/1972 | Reijonen et al. | 210/170 |
| 4,478,765 | 10/1984 | Tubbs | 210/170 |
| 4,638,064 | 7/1987 | Hallberg et al. | 210/605 |
| 4,755,304 | 7/1988 | Hallberg et al. | 210/747 |
| 4,879,046 | 11/1989 | Kojima | 210/747 |
| 5,006,250 | 4/1991 | Roberts et al. | 210/747 |

FOREIGN PATENT DOCUMENTS

| | | |
|---|---|---|
| 0206690 | 12/1986 | European Pat. Off. |
| 434388 | 7/1984 | Sweden |
| 439917 | 7/1985 | Sweden |
| 8504197 | 9/1985 | Sweden |

*Primary Examiner*—Peter A. Hruskoci
*Attorney, Agent, or Firm*—Pollock, Vande Sande & Priddy

[57] ABSTRACT

The present invention refers to a process for creating in an aquifer an oxidation and precipitation zone (or a reduction zone) between a number of injection wells arranged around one or more extraction wells for purified water. The zone desired is created intermittently between each pair of adjacent injection wells by (i) introducing oxygen, oxygen-containing gas or an oxygen-releasing substance (or an oxygen-consuming substance) into the water in both wells and (ii) pumping the water in one well from below upwards while pumping the water in the other well from above downwards, whereby a circulation circuit is formed in the aquifer between the wells. A device for carrying out said process comprises an outer tube (1), sealing means (2), an inner tube member (3), a transversal wall (4) with a central opening, an elongation tube (5), an inner flow pipe (6) and conduits (7,8) for supply of air.

6 Claims, 1 Drawing Sheet 5,362,400

PROCESS FOR THE PURIFICATION OF WATER

FIELD OF THE INVENTION

The present invention relates to water purification, and more particularly to a process for creating, in an aquifer, an oxidation and precipitation zone for in situ precipitation of substances in the ground water the content of which it is desired to decrease, or a reduction zone for the reduction of substances not desired in the ground water.

BACKGROUND OF THE INVENTION

The Swedish patent specification 8206393-4 (corresponds to European patent specification 0160774) describes a process for decreasing the contents of iron and manganese in ground water flowing through an aquifer, wherein a "curtain-type" zone for the oxidation and precipitation of iron and manganese is created by intermittently introducing water containing oxygen or oxygen-releasing substances through a number of injection wells arranged around one or more extraction wells for purified water. During each introduction of water containing oxygen or oxygen-releasing substances the water is fed to only some of the injection wells and simultaneously water is drawn from nearby, adjacent or intervening injection wells. The oxygen-containing water thus introduced creates a suitable environment for certain bacteria so that these, in combination with purely chemical processes, will bring about precipitation of the iron and manganese in the existing ground layers which will thus serve as a filter. The oxygen-containing water is added intermittently, for example, for a period of about 24 hours.

The Swedish patent specification 8400190-8 (corresponds to European patent specification 0154105) describes a process for decreasing the content of nitrate in ground water by reducing the nitrate to nitrogen in a reduction zone (denitrification zone) created between a number of injection wells arranged around one or more extraction wells for purified water. The reduction zone is formed in the same manner as the above described oxidation zone but water containing denitrification organisms and/or substrate therefore is fed to the injection wells instead of water containing oxygen or oxygen-releasing substances. Normally only substrate (oxygen-consuming substance) is added, such as sucrose, methanol, ethanol, an acetate or molasses.

For the creation of such oxidation and reduction zones an extensive pipe system is required, for example, for oxygenating water in an oxygenator station and pumping water to and from the injection wells. Moreover, the wells need to have a rather large diameter, of about 125 mm for accommodating an submersible pump.

SUMMARY OF THE INVENTION

According to the present invention such oxidation and reduction zones are created in a different and simpler manner. Thus, according to one embodiment the invention relates to a process for creating, in an aquifer, an oxidation and precipitation zone between a number of injection wells arranged around one or more extraction wells for purified water, which zone is intended for in situ precipitation of substances not desired in the ground water. This process is characterized in that the zone desired is created intermittently between each pair of adjacent injection wells by (i) introducing oxygen, oxygen-containing gas or an oxygen-releasing substance into the water in both wells and (ii) pumping the water in one well from below upwards while pumping the water in the other well from above downwards, whereby a circulation circuit is formed in the aquifer between the two wells.

Thus, in the well wherein the water is pumped from below upwards water will flow in through the lower part of an apertured well tube (or through one or more lower portions of apertured well tubes) and flow out through the upper part of the apertured well tube (or through one or more upper portions of an apertured well tube). The opposite is true for the well wherein the water is pumped from above downwards. It may sometimes be appropriate to reverse the pumping direction in the two wells after a certain time. Such oxygenation and circulation flow may be effected simultaneously between two or more pairs of adjacent injection wells, if desired.

According to a modification of the process described above a reduction zone for the reduction of substances not desired in the ground water is created between a number of injection wells arranged around one or more extraction wells for purified water by introducing an oxygen-consuming substance into the injection wells instead of oxygen, oxygen-containing gas or oxygen-releasing substance.

The necessary regeneration frequency for the zone between two specific injection wells is determined from case to case on the basis of the water flow between the wells and the water quality in the area in question. These data are determined in connection with the sinking of the injection wells. Also the suitable distance between adjacent injection wells is determined by means of the water flow, that is the hydraulic conductivity in different directions.

The invention is applicable not only in the precipitation of iron and manganese from the ground water but also in the precipitation of other undesired substances, such as aluminium and fluorine. When precipitating fluoride ions it is normally necessary to introduce also calcium ions in a suitable form into the precipitation zone via the injection wells.

Around one and the same extraction well it is also possible to create both an outer reduction zone, for example, for reducing nitrate) and an inner oxidation zone, for example, (for oxidizing and precipitating iron and manganese and for stripping nitrogen gas formed in the reduction of nitrate).

The present invention also comprises a device for carrying out the process in a number of injection wells arranged around one or more extraction wells for purified water, which injection wells each comprises an outer tube, which at least at the ground-water-carrying portion of its length is apertured and water-pervious, and is distinguished substantially in, that approximately at the middle of the length portion it is internally mounted sealingly and concentrically by the intermedation of sealing means an inner tube member of smaller diameter and predetermined length. The tube member is closed at its upper end by a transversal wall with a central opening, from which extends upwardly at a distance an elongated tube. An inner flow pipe extends from the upper end of the outer tube and downwardly to a position slightly below the upper end of the elongation tube. The inner flow pipe has a diameter which is smaller than that of the outer tube but greater than that of the elongation tube. Conduits are provided for supply of air to the area within and closest above, respectively, the tube member furthermore extending from above and downwardly along the inside of the outer tube.

BRIEF DESCRIPTION OF THE DRAWINGS

By way of example the present invention will be further described below with reference to the accompanying drawing, in which.

DETAILED DESCRIPTION OF THE PREFERRED EMBODIMENT(S)

Figure 1:
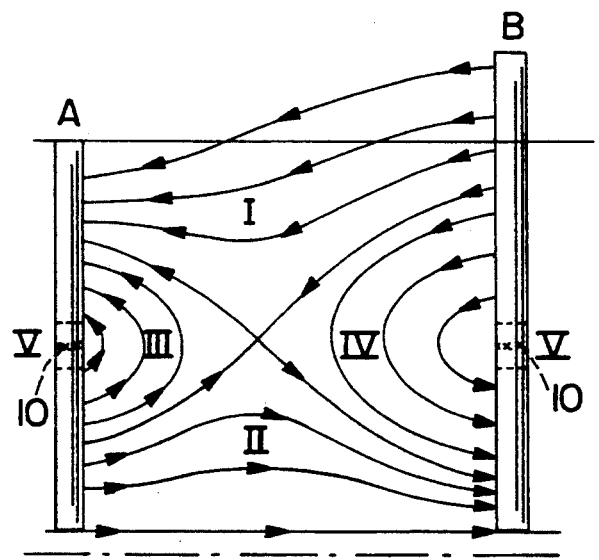
FIG. 1 diagrammatically illustrates the circulation flow which can be provided according to the present invention in the ground layer between pairs of adjacent injection wells; and, FIG. 2 illustrates in detail how an injection well might be supplied with air for flowing of water downwardly and upwardly, respectively.

FIG. 1 illustrates a pair of adjacent injection wells A and B. In the well B water is carried from below and upwardly, while in the well A water is carried from above and downwardly, the pattern of the flow lines illustrated by the lines I–IV being obtained in the ground layer between the wells A and B and above and below, respectively, the circulation devices V.

Figure 2:
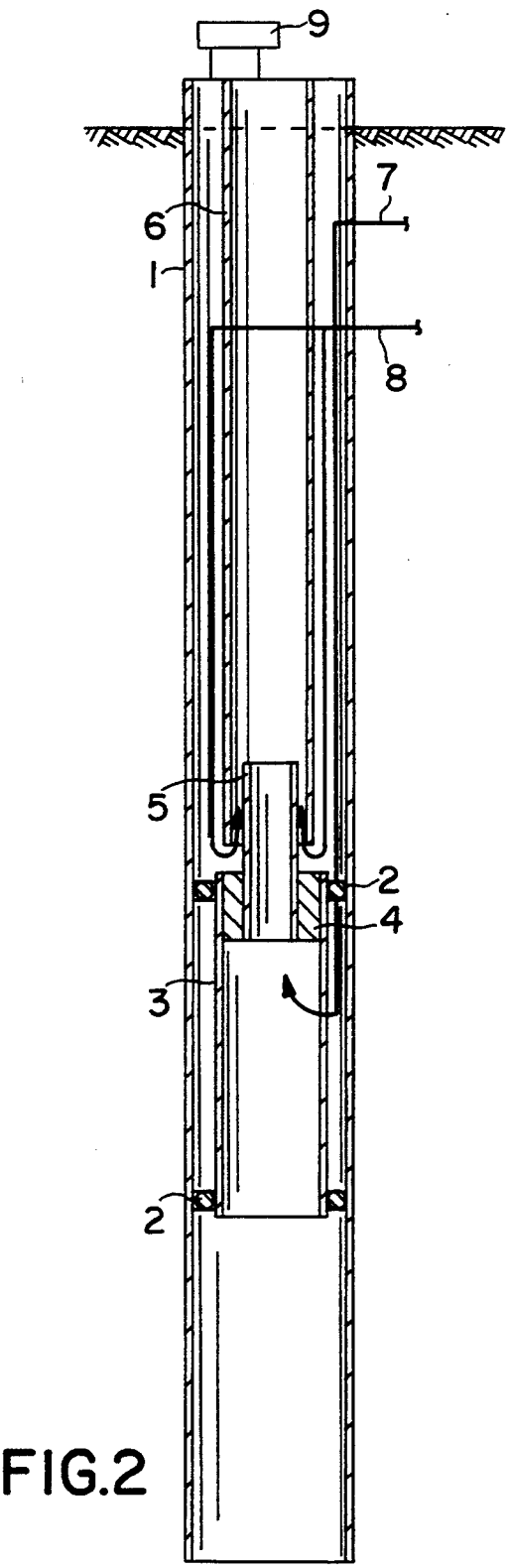

The circulation devices V have been symbolically illustrated in FIG. 1 as a separate tube portion in each well, which might be provided with a preferably electrically driven propeller, if desired. How such a tube portion thus might be designed is further illustrated in FIG. 2.

In an outer tube 1 in an injection well A or B at a position approximately in the middle between the bottom of the well and the ground-water surface is concentrically mounted an inner tube member 3 with smaller diameter and predetermined length. The outer tube 1 is, at least over the greater part of the ground-water-carrying area of its length, apertured and water-pervious and the inner tube member 3 is sealed against the inner wall of the tube 1 by means of suitable sealing means, such as inflatable sealing rings 2. Adjacent its upper end the inner tube member 3 is closed by means of an annular wall 4, from the central opening of which extends upwardly an elongation tube 5. From the upper end of the outer tube 1 extends an inner flow pipe 6 concentrically in downward direction, which tube 6 suitably has a diameter which is greater than that of the elongation tube 5 but smaller than that of the inner tube member 3. The lower portion of pipe 6 is located slightly above the upper end of the tube member 3 but below the upper end of the elongation tube 5. For supply of air a conduit 7 extends along the inside of the outer tube 1 and opens into the tube member 3. A conduit 8, opens into the gap between the flow pipe 6 and the elongation tube 5. The outer tube 1 and the inner flow pipe 6 have at their upper end a de-aeration device 9 of a known type.

When pumping water from below and upwardly air is thus supplied through the conduit 7, which provides for a upwardly directed flow of water centrally through the tube member 3 and the elongation tube 5 and more water is drawn into the lower apertured portion of the tube 1. The external flow of water is illustrated by well B in FIG. 1. In the upper portion of the tube 1, which is slotted, water is forced upwardly to a level slightly above the initial ground water surface and outwardly into the ground layer, flow lines according to I in FIG. 1 being obtained in a direction towards the injection well A.

On the other hand, if water is to be pumped from above and downwardly, air is supplied through the conduit 8, and water is caused to flow upwardly along the outside of the elongation tube 5 and downwardly at the inside of the tube and further downwardly within the tubes 3 and 1. Thereby flow lines II and III in FIG. 1 arise, that is water penetrates into the upper portion of the tube 1 and is expelled from the lower portion of the same tube. It is only for greater level differences and pumping heights that an auxiliary mechanical pumping device 10 is required, located within the tube member 3, such as outlined in the drawing. A pumping device there might in such cases be used, for instance, a smaller electrically driven propeller or impeller with reversible rotational direction. It is also possible to use a small pump driven by an electrical motor and located in a superstructure of the well or an ejector device or any other device well-known to the artisan.

The water delivery capacity which, for example, the mammoth-pump or the propeller needs to have, can amount to between 0.1 and 15 l/sec, dependent on the prerequisites and for a lifting height of for instance 5–15 m.

A solid or liquid oxygen-releasing or consuming substance is to be introduced into the water in an injection well, might be introduced either as such or in the form of a solution or a slurry in water, which is introduced in a suitable way into the tube member 3.

The method according to the invention is simpler than the method previously known and hence also essentially cheaper, particularly as to the installation costs. While in the previous method the injection wells had to have a diameter of about 125 mm for housing a submersible pump in the well, for which a heavy and powerful drilling equipment was required and the drilling costs thereby amounted to several thousand Swedish crowns per hole. In the present invention only a drilling hole diameter of about 50 mm is required, since only a smaller propeller need to be mounted within the well. For making such holes, a much simpler and completely portable drilling equipment might be used and therefore the manufacturing costs amount to only some hundred crowns per hole. Furthermore, no water pipes are required between the injection wells or between the latter and the extraction well and also no separate oxygenator station is needed.

I claim:

1. A process for treating water within an aquifer to purify said water comprising:
   (a) establishing within said aquifer at least one extraction well for extracting purified water from said aquifer and at least two spaced-apart injection wells for injecting oxygen, an oxygen-containing gas, an oxygen-releasing substance or oxygen-consuming substance into said aquifer, each of said injection wells having upper and lower water permeable portions;
   (b) introducing oxygen, an oxygen-containing gas, an oxygen-releasing substance or oxygen-consuming substance into each of said injection wells in an amount effective to purify said water; and
   (c) pumping water from said aquifer into one injection well through its lower permeable portion upwardly into its upper permeable portion and pumping water from said aquifer into the other injection well through its upper permeable portion downwardly into its lower permeable portion to circulate water in the aquifer between said injection wells.

2. A process according to claim 1, wherein said oxygen, an oxygen-containing gas, or an oxygen-releasing substance is introduced.

3. A process according to claim 1, wherein said oxygen-consuming substance is introduced.

4. A process for creating, in an aquifer, an oxidation and precipitation zone between a plurality of injection wells arranged around one or more extraction wells for purified water, for in situ precipitation of substances not desired in the ground water, comprising creating said zone between a pair of adjacent injection wells each having upper and lower permeable portions by:
  (a) introducing oxygen, oxygen-containing gas or an oxygen-releasing substance into both injection wells in an amount effective to oxidize and precipitate said substances; and
  (b) pumping the ground water from said aquifer into one injection well through its lower permeable portion upwardly into its upper permeable portion and pumping ground water from said aquifer into the other injection well through its upper permeable portion downwardly into its lower permeable portion to circulate water in the aquifer between the two injection wells.

5. An injection well for treating and circulating water within an aquifer comprising:
  (a) an outer tube extending into said aquifer, said outer tube having an inner wall, an upper end portion, a lower end portion and an intermediate portion, said outer tube being pervious to water in at least that portion thereof within the aquifer;
  (b) an inner tube sealingly mounted within said intermediate portion of said outer tube, said inner tube having upper and lower ends;
  (c) an elongation tube having a smaller diameter than said inner tube and having upper and lower end portions, the lower portion of said elongation tube being mounted within said inner tube to form an annular space with the upper end of said inner tube;
  (d) an annular water-impervious wall positioned in said annular space between the lower end portion of said elongation tube and the upper end portion of said inner tube;
  (e) an inner flow pipe mounted within said outer tube and extending downwardly from the upper end portion of said outer tube to a position below the upper end portion of said elongation tube, said inner flow pipe forming an inner annulus with said elongation tube and an outer annulus with said outer tube;
  (f) a first conduit mounted within said outer annulus for supplying air upwardly through said inner annulus, downwardly through said elongation tube into said lower portion of said outer tube and into said aquifer; and
  (g) a second conduit mounted within said outer annulus for supplying air into said inner tube positioned to flow air upwardly through said elongation tube.

6. An injection well according to claim 5, wherein said inner tube includes apparatus for pumping water.

* * * * *